R. A. READ.
FOCUSING DEVICE.
APPLICATION FILED MAY 22, 1917.
1,258,459.
Patented Mar. 5, 1918.
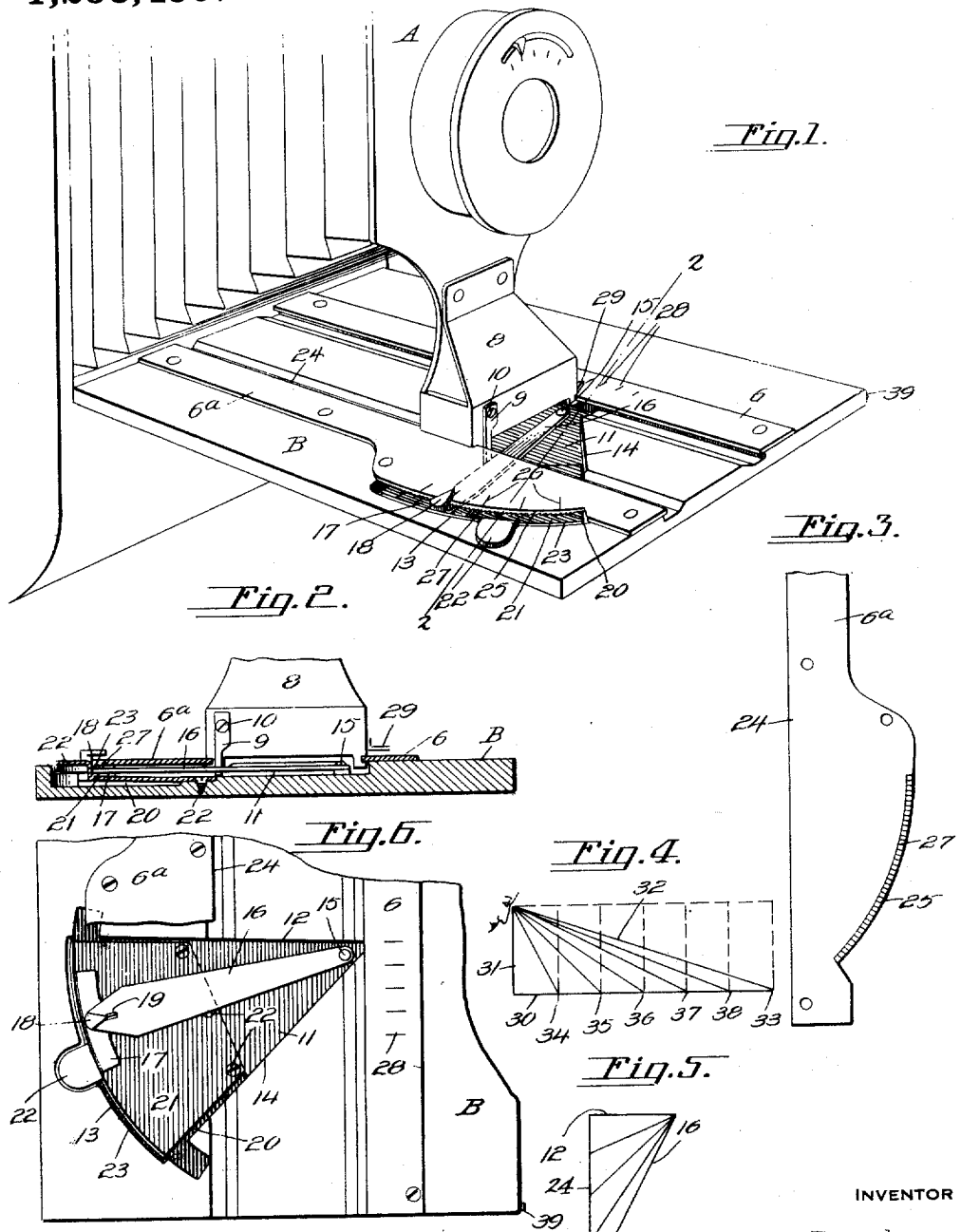
INVENTOR
R. A. Read.
BY Victor J. Evans
ATTORNEY
WITNESSES
F. C. Gibson.
H. G. Pierson.

UNITED STATES PATENT OFFICE.

RICHARD A. READ, OF BAHIA, BRAZIL.

FOCUSING DEVICE.

1,258,459. Specification of Letters Patent. Patented Mar. 5, 1918.

Application filed May 22, 1917. Serial No. 170,267.

*To all whom it may concern:*

Be it known that I, RICHARD A. READ, a subject of the King of England, residing at Bahia, Brazil, have invented new and useful Improvements in Focusing Devices, of which the following is a specification.

This invention is a focusing device wherein the lens or front board may be moved independently of the device and each are capable of independent movement relative to each other.

In practically all the devices on the market as particularly applied to box and hand or the folding types of cameras, it is necessary to estimate the distance between the subject or object to be photographed and the lens. This has been found to be detrimental in that oftentimes a much wanted picture is valueless from its being out of focus.

In order to overcome the objections found in existing devices on the present day cameras and to conform to the requirements of a focusing device, this invention has for one of its objects to provide a device that may be readily attached to a camera in such a manner that it will correctly focus the object or subject for the particular lens employed.

Another object is to provide a device for focusing wherein when such focus has been obtained the device will remain stationary in that position until reset for a second operation, and upon releasing the retaining elements, the device may be permitted to have free movement.

A further object is to provide a focusing device that will comprise elements that are capable of independent operation so that the focusing may be done either by estimating in the usual manner or by using the automatic part of the device.

A still further object is to provide a focusing device having a substantially constant perpendicular and a variable base line, the length of the hypotenuse of such a right triangle varying with the base and the acute angles.

Broadly stated the invention comprises an arm or indicator pivotally mounted for a free movement so that the free end of the arm will describe an arc, a member preferably having an arcuate edge to coöperate with the arm or indicator and form part of a locking means which may be adapted to position and retain the arm against movement in one direction, which means are also capable of permitting a free movement of the arm in two directions, and a movable carriage which may have secured to it a stop member that is movable to engage with one side of the arm, said carriage being movable in a straight line, causing the stop to engage with the arm according to its angular position, which position corresponds to the varying hypotenuse, and the movement of the carriage corresponds to a varying length of base with a constant length perpendicular.

One practical form of construction and assembly will be described and illustrated in the accompanying drawings, in which—

Figure 1 is a perspective view of a portion of a camera with its front board dropped and showing a focusing device mounted thereon.

Fig. 2 is a sectional view on the line 2—2 of Fig. 1.

Fig. 3 is a bottom plan view of the plate forming a part of the locking means.

Fig. 4 is a diagrammatic view showing the trigonometric function as applied to finding the focus.

Fig. 5 is a diagrammatic view to illustrate the same function relative to the carriage movement.

Fig. 6 is a top plan with parts broken away.

In the preferred and one practical embodiment of the invention about to be described, the camera may be generally designated by the letter A, which camera is shown as being of the folding type that is commonly employed.

The type of camera shown is for illustrative purposes only as the device may be applied, generally speaking, to any type or class of camera that requires focusing. The camera A is provided with the usual front or bed board B which is dropped in order to permit the bellows to extend outwardly from the box of the camera. This board B may be provided with the usual guides 6 and 6ª on which is adapted to ride or engage the lens or front board carriage 8.

The carriage and the guides are formed in any suitable manner which will permit them to serve their respective functions. As shown in Fig. 1, the carriage 8 is provided with a suitable stop member 9 which is secured to the carriage by a suitable fastening such as the screw 10 to provide for adjusting the stop. The front B is provided with suitable recesses, one of which is indicated at 11. As shown this recess 11 has one straight side 12 extending transversely of the front and terminates adjacent one edge in an arcuate portion 13. This arcuate portion is connected to the side 14 that extends in an angular direction and is connected with the straight or transverse side 12. As shown this recess 11 is sector shaped so that the several elements may be disposed in workmanlike manner therein.

Adjacent the angle between the sides 14 and 12, there is disposed a pivot or pin 15 which is adapted to form a pivotal mounting with the arm or indicator 16. The mounting of this arm 16 on the pivot 15 is to be such as will permit a free movement of the arm with as little friction as possible. By having this mounting substantially frictionless, the accuracy of the movement of the arm 16 is increased.

The free end of the arm 16 has an arcuate member 17 which may also serve as a riding member therefor. This free end of the arm 16 as shown, is provided with an upstanding member having a pointer or indicator 18 that is adapted to lie in a plane parallel to the arm 16. The riding member 17 and the pointer 18 as well as the arm 16 may be formed of any suitable material. If desired, the arm 16 adjacent the pointer or indicator 18 may be provided with the teeth 19 as shown in Fig. 6.

The recess 11 is provided toward the arcuate end with a segmental recess 20 that is adapted to receive a segmental plate 21. The plate 21 is secured at this inner arcuate end, in any suitable manner, to the front B, one means being shown by the screws 21ª. This segmental plate 21 may, if desired, be formed of resilient material and of such shape that its outer arcuate edge rests above the bottom of the recess 20. In order to depress the outer arcuate edge suitable means are employed, one of which is shown by the button 22.

As shown in Fig. 2, the outer arcuate edge of the segmental plate 21 is provided with a flange 23 that may serve as a guide for the riding member 17, which riding member is adapted to engage and ride over the outer surface of this plate 21. The guide 6ª is of the usual construction and if desired it may be formed as shown in Figs. 1 and 3. In these figures the guide 6ª is illustrated as having a straight side 24 forming a base line of the triangle shown in Fig. 5 which is adapted to coöperate with the carriage 8. The other edge of the guide is arcuate as indicated at 25, that is to say it has an arcuate portion which coöperates with the pointer 18 carried by the arm 16.

The upper surface of this guide plate 6ª adjacent the arcuate edge 25 may be provided with suitable markings or graduations indicated at 26. These markings or graduations are purely arbitrary and vary according to the focus of the lens employed. Adjacent the arcuate edge 25 there may be formed suitable friction means 27 which are shown in this instance as having the tooth-like or rack formation.

The friction means illustrated by the teeth 27 are adapted to engage with the friction means 19 carried by the arm 16. The coöperation between these several friction elements serving to retain the arm 16 in a plurality of positions. They are preferably so arranged that the forward movement of the arm 16 is restrained which arm then serves as an abutting member for the stop 9.

When assembled the segmental plate 21 serves to force the arm 16 through its friction means 18 into engagement with the friction means 27 carried by the guide 6ª. The upward pressure of the segmental plate 21 is preferably imparted to the arm 16 by the riding member 17. If desired, the usual focusing scale 28 may be positioned for coöperative action with the pointer 29 carried by the carriage 8. This will provide for the additional use of the ordinary estimating scale for determining the focus or distance between the lens and the subject to be photographed.

In diagram 4, the base line is indicated at 30, the perpendicular at 31 and the hypotenuse of the right triangle so formed is indicated at 32. The apex of the triangle is indicated at 33 which point corresponds to the focus of the lens when directed toward an object 100 feet or more away.

The other hypotenuse lines indicated at 34, 35, 36, 37 and 38 will correspond to other distances on the base line 30. The perpendicular 31 is of practically constant or unvarying height and preferably corresponds to the eye level of the individual whose average height is 5 ft. 8 in. The hypotenuse lines correspond to the line of sight as employed by the sighting means on the edge of the front board.

In Fig. 5, the right triangle is so formed that its perpendicular corresponds to the transverse or straight side 12 of the recess 11, that is to say it lies in a plane parallel thereto. The perpendicular of this triangle is an imaginary line which passes through the center of the arm 16 and the pin 15 when the arm is moved backward to the limit of its movement toward the side 12.

The arm 16 in swinging over the segmental plate 21 increases the base of the triangle which in this instance is formed by the edge 24 of the guide 6ª, from which movement of the arm 16 it will be seen that not only the base line is increased but that the hypotenuse is also lengthened. The ca riage 8 and its pointer 9 moving in a straight line will contact with the arm 16 at different points which correspond to the different angular positions of the arm. This method of focusing is considerably different than that which has been employed heretofore in focusing devices and enables the user to correctly focus the lens upon a particular subject at an unknown distance to obtain a sharp negative.

In practical operation as is shown more particularly by the assembly illustrated in Fig. 1 when it is desired to focus upon the object, the left hand side of the front B is employed as a sighting plane and corresponds to the varying length hypotenuse. It is desired to provide one end of the front B with a suitable pin or other sighting element 39, which is in one sense a type of front sight.

When the user sights along this left hand edge which is directed toward the object to be photographed, the pressing of the button 22 will permit the arm 16 to swing freely on its pivot. This arm being slightly weighted at this free end tends to come to rest immediately at the desired inclination of the edge, at which time the button is released, and the arm is firmly retained in that position against forward movement. The carriage 8 is then moved forward until the pin or stop member 9 abuts and engages with the arm 16. The lens will then be in correct focus for objects at that distance. If the object is at a distance, say corresponding to a 100 ft., the pointer or indicator will come to rest adjacent the inner end of the graduations or scale 26 which corresponds to infinity. The nearer the subject to be photographed is to the lens, the greater the inclinations that must be given to the edge of the front B.

With this device the object or subject to be photographed is assumed to lie in vertical planes and therefore when sighted along the edge of the front B, the front sight 39 is directed to the base of the object which is the distance point corresponding to the base line 30, which distance point is indicated at 33. One particular feature of operation is that which enables the user of this device to position his lens so as to correctly focus the subject to be photographed, and that is the carriage 8 travels with a straight line motion and along the edge 24 of the guide 6ª. In doing so the base line corresponding to the edge 24 is lengthened due to the angular positions of the arm 16.

From the assembly described and shown, it will be seen that the user may employ the graduations 26 for independent and manual operations irrespective of the other focusing feature, both features of the device are those available for independent action.

In taking a picture, the user naturally looks at the object or subject to be photographed, and with this device that look is converted from the mental process of distance estimating into a mechanical procedure. Thus the personal equation is practically eliminated as neither effort nor thought are expended.

This is an advantage over existing devices with which it is necessary either to correctly estimate the distance or to aline reflected images. With a reflection this is not always the easiest thing to do as there may be no well defined lines capable of distortion.

In Fig. 4, the vertical dotted lines correspond to the vertical planes of the objects or subjects and the full lines leading from the eye point to the points 34, 35, 36, 37 and 38 on the base line 30 indicate respectively the angles of inclination.

The points 34, 35, 36, 37, and 38 may represent the inclinations corresponding to the distances which may be 6, 15, 25, 50 and 100 feet respectively though this marking or graduating is arbitrary. The teeth 27 of the friction device, may also be employed to retain the arm 16 at positions intermediate of the regular markings.

With the usual focusing scale employed these intermediate positions are possible but they have to be found by estimating so that the user is confined to the permanent workings. From which it will be found that the device herein described requires no more time or effort than would be devoted to positioning the object or subject in the finder.

What is claimed as new is:—

1. In a focusing device for cameras, a movable lens carriage having a stop thereon, a bed, a slide way for the carriage on the bed, an angle indicator on the bed employing a triangle having a substantially constant perpendicular with changeable lengths of hypotenuse and base line, a freely swinging arm forming the hypotenuse, said carriage in moving over the slide way, which forms the base line, and serves to position the stop against the arm, means to retain the arm in a plurality of positions, and sighting means to coöperate with the arm in determining its position relative to an object and the camera.

2. In a focusing device for cameras, a casing having a bed sighting means on the bed, instrumentalities mounted on the bed and under manual control, which instrumentalities include a freely swinging arm whose position is determined by the sighting means, a lens carriage movable on said bed, and a stop on the carriage for engaging with the arm.

3. In a focusing device for cameras, a bed, a lens carriage movable thereon, sighting means on the bed to coöperate with an object, a freely swinging arm on the bed whose position is determined by the inclination of the bed upon sighting, a stop on the carriage to engage with the arm, and means operative to retain the arm in any one of its positions.

4. In a focusing device for cameras, a bed, an inclinometer mounted thereon and having a freely movablye arm, means to retain the arm in a plurality of positions against movement in one direction, a lens carriage movable on the bed, a stop on the carriage to coöperate with the arm, sighting means on the bed to incline the bed for permitting the arm to come to rest in a position relative to the sides of a triangle.

5. In a camera, the combination with a casing, a front board, and a longitudinally movable lens carriage, of a stop on the carriage, an arm pivotally mounted on the front board to swing freely, an arcuate-shaped member adapted to coöperate with the free end of said arm, means to restrict the arm movement in one direction, which means are also operative to retain the arm in a plurality of positions so that when the stop is brought into engagement with one side of the arm the lens carriage movement is arrested.

6. In a camera, the combination with a casing having a movable lens carriage, and a front drop board, of an inclinometer on the board, said inclinometer having an arm mounted for free movement, means on the front drop board for sighting, friction devices to restrain the arm movement, and a stop on the carriage, which stop is adapted to move on the base line of a right triangle, the hypotenuse of the triangle being formed by the arm.

7. In a camera, the combination with a casing having a bed, a movable lens carriage therefor and means for moving the lens carriage, of means on the bed, manually controlled, to permit the positioning of a freely movable member at the proper focal distance upon inclination of the casing, said carriage then being brought into engagement with the member, and sighting means to determine the position of said member.

8. In a camera, the combination with a casing having a bed, a movable lens carriage therefor, and means for moving the carriage, of an element on the bed adapted to freely swing upon inclination of the casing, manually operated devices to control and to retain the element in a variety of positions, a stop member on the carriage that is adapted to abut against the element intermediate of its ends in any one of the positions of the element, and sighting means to determine the angular inclination of the freely swinging element.

9. In a camera, the combination with a casing having a front board and a lens carriage movable thereon, and means for moving the carriage, of a stop on the carriage, sighting means on the board, and manually controlled means including a pivotally mounted arm, said means being operative on the inclination of the casing to permit the arm to freely position itself by gravity, and to retain said arm after such positioning, whereupon said lens carriage is moved until its stop engages with the arm, said sighting means on the bed determining the inclination of the casing and proper position of the arm.

10. The combination with a camera, of a distance finder on said camera, which comprises a pivotally mounted arm that is movable by gravity upon inclination of the camera, means to control the arm, a movable lens carriage having a stop thereon to coöperate with the arm, said means being operative to control the arm as it positions itself upon inclination of the camera for the correct distance between the object and lens, and sighting means to coöperate with the arm to determine the proper angular position of said arm upon inclination of the camera.

11. A focusing device for cameras which comprises a casing, a front board having spaced guides thereon, a lens carriage movable longitudinally on said guides, the width of the carriage corresponding to the perpendicular of a triangle, a stop on the carriage, an arm pivotally mounted on the board to limit the movement of the carriage when the stop engages with the arm, said arm corresponding to the hypotenuse of the triangle, and the movement of the carriage on its guides producing a variable base line, and sighting means on the board for determining the position of the arm.

In testimony whereof I affix my signature.

RICHARD A. READ.